United States Patent
Reefman et al.

(10) Patent No.: US 7,127,644 B2
(45) Date of Patent: Oct. 24, 2006

(54) METHOD AND ARRANGEMENT FOR CONCEALING ERRORS

(75) Inventors: Derk Reefman, Eindhoven (NL); Alphons Antonius Maria Lambertus Bruekers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1104 days.

(21) Appl. No.: 09/925,344

(22) Filed: Aug. 9, 2001

(65) Prior Publication Data

US 2002/0080957 A1 Jun. 27, 2002

(30) Foreign Application Priority Data

Aug. 11, 2000 (EP) .................... 00202832

(51) Int. Cl.
*H03M 13/33* (2006.01)
*G08C 25/00* (2006.01)

(52) U.S. Cl. ............ 714/699; 714/748; 714/774; 341/143

(58) Field of Classification Search .......... 714/699, 714/746, 774, 748; 341/143; 375/242
See application file for complete search history.

(56) References Cited

U.S. PATENT DOCUMENTS 4,901,077 A * 2/1990 Christopher .......... 341/143
5,353,059 A * 10/1994 Lawlor et al. ......... 375/240.11
5,715,312 A 2/1998 Ijtsma ................ 380/3
6,636,565 B1 * 10/2003 Kim ................ 375/240.27

FOREIGN PATENT DOCUMENTS

EP 0602604 A1 6/1994

OTHER PUBLICATIONS

Pfann et al., "Realization of the LMS algorithm with sigma-delta input signals", 1997, IEEE, pp. 420-424.*
D. Reefman et al, "AES Convention Pape: Editing and Switching in 1-Bit Audio Streams", Internet Article, 'Online!, May 12-15, 2001, pp. 1-8, XP002186478.

* cited by examiner

Primary Examiner—Matthew Smithers

(57) ABSTRACT

A method of concealing errors in a single bit bitstream comprises low pass filtering the bitstream, replacing the low pass filtered signal during an error by a low frequency approximation of the signal and subsequently converting the signal by a $\Sigma\Delta$-modulator into a regenerated single bit bitstream. During the absence of an error the original bitstream may be outputted and during an error the regenerated bitstream, which is obtained from a $\Sigma\Delta$-modulator, which is bit-synchronized to the original bitstream.

4 Claims, 1 Drawing Sheet

METHOD AND ARRANGEMENT FOR CONCEALING ERRORS

Figure 1:
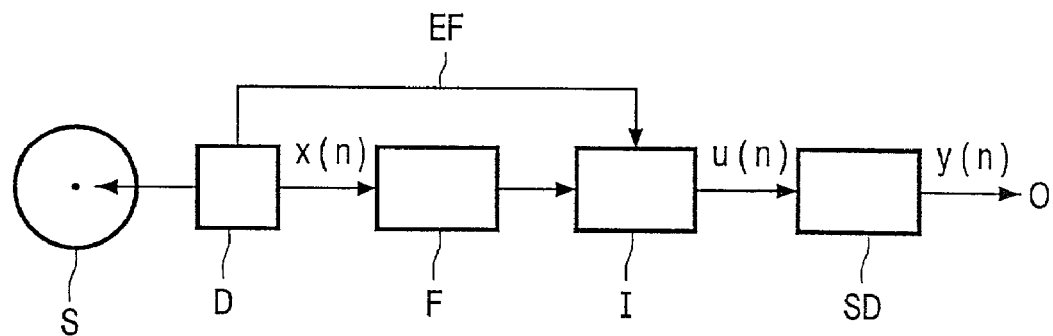

This invention relates to a method for concealing errors in a digital information signal. Such method is e.g. known from U.S. Pat. No. 5,715,312.

Usually, when a digital information signal is stored on a storage medium, the storage medium also comprises an error correction code, which makes the retrieval from the medium more robust against possible errors in the information signal. However, sometimes the error correction fails and then the remaining failures may extend for at least one frame or a number of frames. Such failure will, because of its duration of e.g. 1/75 sec. or more, be very troublesome. The technique of error concealment seeks to replace the damaged area of the signal by a signal from a neighbouring undamaged frame.

The present invention has for its object to provide a method for concealing errors in a single bit bitstream signal. Such signal format is e.g. adopted for the Super Audio Compact Disc (SA-CD) and the method according to the invention is therefore characterized in that the digital information signal is a single bit bitstream and that the method comprises low pass filtering the single bit bitstream for constructing the low frequency contents of the single bit bitstream, interpolating the low frequency contents during an error using low frequency contents before and/or after the error and converting the low frequency signal obtained after the interpolating into a regenerated single bit bitstream with concealed errors by means of a $\Sigma\Delta$-modulator.

This method results in a cheap and easy to implement error concealment of single bit digital signals. However, the quality standard is not very high. The method implies that a signal, which is once quantized in a $\Sigma\Delta$-modulator, is requantized in a second $\Sigma\Delta$-modulator. Especially at the higher signal frequencies, which are still of importance for the faithful reproduction of the signal (e.g. about 100 kHz in case of audio-signals), multiple quantization causes such deterioration of the signal quality that highest quality standards are not anymore fulfilled. In order to avoid such deterioration of the signal quality, the method according to the invention may further be characterized by outputting the received single bit bitstream during the absence of an error and outputting the regenerated single bit bitstream during the occurrence of an error and by bit-synchronizing the $\Sigma\Delta$-modulator to the received single bit bitstream. When a single bit bitstream is low pass filtered and then remodulated into a second single bit bitstream, the two bitstreams are not any more identical so that switching between the two bitstreams causes audible clicks. To avoid these clicks the two bitstreams have to be bit-synchronized in order to ensure that the two bitstreams are, substantially, equal around the moments of switching. Suitable methods of bit-synchronizing two bitstreams are disclosed in applicants copending European patent application . . . (ID 602604).

The invention also relates to an arrangement for carrying out the above described methods. Such arrangement may be characterized in that it comprises in cascade a low pass filter for constructing the low frequency contents of the single bit bitstream, means for replacing the low frequency contents during an error by a low frequency approximation of the signal and a $\Sigma\Delta$-modulator for converting the low frequency signal obtained after the replacement into a regenerated single bit bitstream with concealed errors. The arrangement may preferably be further characterized by switching means applying the received single bit bitstream to an output terminal during the absence of an error and applying the regenerated single bit bitstream to the output terminal during the occurrence of an error and means for synchronizing the $\Sigma\Delta$-modulator to the received single bit bitstream.

Figure 2:
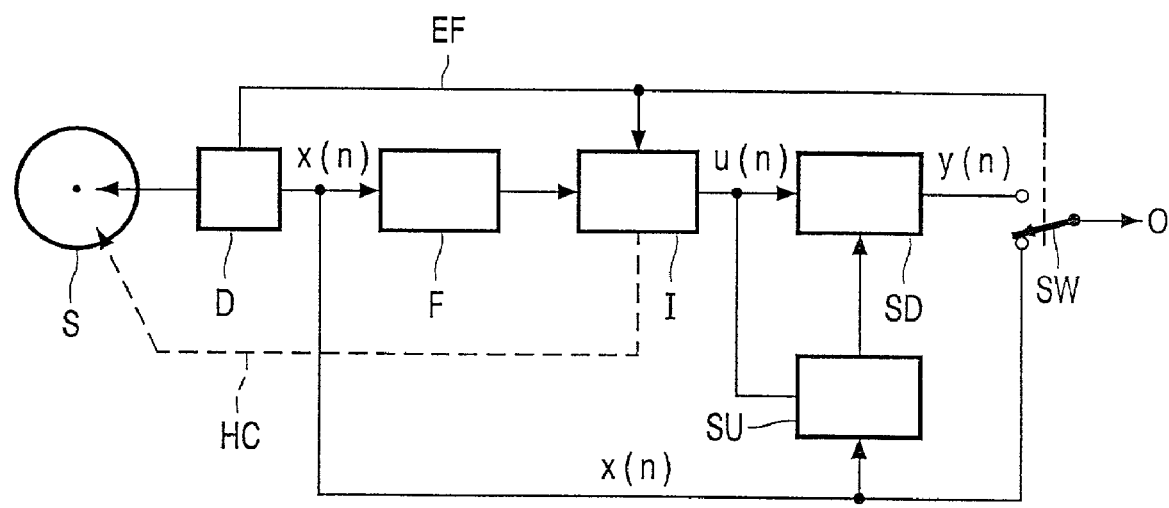

The invention will be further explained with reference to the attached figures. Herein shows:

FIG. 1 a schematic diagram of a first arrangement according to the invention and FIG. 2 a schematic diagram of a second arrangement according to the invention.

The arrangement of FIG. 1 comprises a compact disc storage unit S from which the stored information signal is obtained. This signal, which is a single bit digital signal in compressed format, is decompressed in decompressor unit D. This unit also performs error correction on the received signal, so that at its output a corrected and uncompressed single bit bitstream is obtained. The unit D also provides an error flag EF to identify those portions of the signal where the error correction failed and which portions have to be concealed in order to avoid or minimize audible distortions.

The single bit bitstream x(n) obtained from the decompressor unit D is e.g. a stream of +1 and −1 bits at a rate of 64×44 , 1 kHz and the mean value of which represents the useful low frequency (audio) information. This information is extracted from the bitstream by a digital low pass filter F, which is preferably of fifth order and which has a cut off frequency of about 100 kHz. This low frequency signal is fed to a unit I which is controlled by the error flag EF and which replaces, during an error, the damaged part of the signal by a reconstruction of the original signal which may be obtained by interpolation. The interpolation is preferably done so, that with the undamaged parts of the signal discontinuities in the signal level are avoided. A useful method of interpolation is e.g. the harmonic retrieval method which is described in the article: "Model Based Processing of Signals: A State Space Approach" of B. D. Rao and K. S. Arun in Proceedings of the IEEE Vol 80, No 2 p.p. 283–309, 1992. Subsequently the repaired LF-signal u(n) is converted to a new single bit bitstream y(n) by means of a $\Sigma\Delta$-modulator SD.

The low pass filter F has the object to free the input of the $\Sigma\Delta$-modulator from too large high frequency signal components. The large HF signal components of the single bit bitstream would otherwise cause the $\Sigma\Delta$-modulator to malfunction and become unstable. For this reason it would be wise to choose the cutoff frequency of the low pass filter as low as possible e.g. at about the highest audible frequency of 20 kHz. However, it has been found that the frequencies between 20 kHz and 100 kHz, although not audible per se, still contribute to the fidelity of the sound perception. For this reason the cutoff frequency of the low pass filter F is preferably chosen at about 100 kHz. On the other hand, these higher LF frequencies have the disadvantage that they cause some distortion (noise) in the $\Sigma\Delta$-modulator SD. Therefore it is advisable to avoid that the signal, which has already been converted to a single bit bitstream prior to its storage on the storage medium S, is converted a second time into a single bit bitstream. This is the object of the arrangement of FIG. 2.

In this arrangement elements, which correspond with those of FIG. 1, have been given corresponding references and need no further explanation. Additionally, this arrangement comprises a switch SW which is controlled by the error flag EF and which connects the original bitstream x(n) from the unit D directly to the output O when there is no error. On the other hand, when the error flag is set, the switch SW connects the output of the ΣΔ-modulator SD to the output O. Therefore, reconversion of the original bitstream into a second bitstream is avoided.

In the arrangement of FIG. 2 measures have to be taken to ensure that the switching over from the original bitstream x(n) to the bitstream y(n) of the ΣΔ-modulator SD and vice versa does not cause audible clicks. These clicks would normally occur because the bits of the two bitstreams will usually not be equal, even when they carry exactly the same LF information. Therefore it is necessary to synchronise the bitstream y(n) of the ΣΔ-modulator to the received bitstream x(n) from the unit D. To this end, the arrangement of FIG. 2 comprises a synchronizing unit SU which receives the information of the original bitstream x(n) from unit D and the digital LF input signal u(n) of the ΣΔ-modulator and which generates a correction signal E for application to one or more of the integrator states inside the ΣΔ-modulator. As already described in applicants copending European patent application (ID 602604) it is achieved by this measure that, after a certain number of bits, the bitstream of the ΣΔ-modulator runs substantially synchronously with the original bitstream. As an example: prior to the switching over from the original bitstream to the bitstream of the ΣΔ-modulator, the ΣΔ-modulator is synchronised to the original bitstream during about 5000 bits, then the switch SW supplies about 40000 bits of the ΣΔ-modulator to the output O, then, until the ΣΔ-modulator is again synchronised to the original bitstream and then the switch reconnects the output O to this original bitstream.

It is noted that the computational effort of the interpolator I is intensive because it has to be done at run time. To simplify or avoid the interpolation, the storage medium S may comprise, in a special area somewhere on the storage medium, a highly compressed image of the data stored normally on the medium. This highly compressed image is applied to the unit I through a dotted line HC and can be used to assist or replace the normal interpolation calculations. The same measure may be taken in the arrangement of FIG. 1.

The invention claimed is:

1. Method of concealing errors in a digital information signal, characterized in that the digital information signal is a single bit bitstream (x(n)) and that the method comprises low pass filtering the single bit bitstream for constructing the low frequency contents (u(n)) of the single bit bitstream, replacing the low frequency contents during an error by a low frequency approximation of the single bit bitstream and converting the low frequency signal obtained after the replacement into a regenerated single bit bitstream (y(n)) with concealed errors by means of a ΣΔ-modulator (SD).

2. Method as claimed in claim 1 characterized by outputting the received single bit bitstream (x(n)) during the absence of an error and outputting the regenerated single bit bitstream (y(n)) during the occurrence of an error and by bit-synchronizing the ΣΔ-modulator (SD) to the received single bit bitstream (x(n)).

3. Arrangement for carrying out the method of claim 1, characterized in that the arrangement comprises in cascade a low pass filter (F) for constructing the low frequency contents of the single bit bitstream, means (I) for replacing the low frequency contents during an error by a low frequency approximation of the signal and a ΣΔ-modulator (SD) for converting the low frequency signal (u(n)) obtained after the replacement into a regenerated single bit bitstream (y(n)) with concealed errors.

4. Arrangement as claimed in claim 3 characterized by switching means (SW) applying the received single bit bitstream (x(n)) to an output terminal (O) during the absence of an error and applying the regenerated single bit bitstream (y(n)) to the output terminal (0) during the occurrence of an error and means (SU) for synchronizing the ΣΔ-modulator (SD) to the received single bit bitstream.

* * * * *